UNITED STATES PATENT OFFICE 2,503,251

PRODUCTION OF FILAMENTS, FIBERS, AND THE LIKE

Edward George Edwards, Salford, and Reginald John William Reynolds, Manchester, England, assignors to Imperial Chemical Industries Limited, a corporation of Great Britain No Drawing. Application January 28, 1946, Serial No. 643,973. In Great Britain February 16, 1945

7 Claims. (Cl. 18—54)

This invention relates to improvements in the production of filaments, fibres and other shaped articles from highly polymeric materials, more particularly from highly polymeric linear polyesters.

It is well known that linear polyesters can be derived from dibasic acids and glycols, and that many of these polyesters, when in a highly polymerised condition, can be formed into filaments and the like which can be permanently oriented by cold-drawing. Recently it has been proposed to manufacture, from glycols or ester-forming derivatives thereof and aromatic dicarboxylic acids or ester-forming derivatives thereof, highly polymeric linear polyesters which are of outstanding value for the production of filaments and fibres for use in the textile industry. For instance, it has been proposed to make such polyesters from terephthalic acid, from acids of the general formula

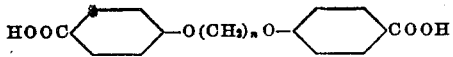

where $n$ is an integer greater than 1, from acids of the general formula

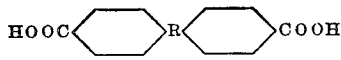

where R is a bond joining the two phenylene residues or the group —$(CH_2)_x$— where $x$ is an integer not exceeding 4, from 1:5-, 2:6- or 2:7-naphthalene dicarboxylic acids, from acids of the general formula

where R is oxygen or one of the groups of the general formula $O(CH_2)_x$

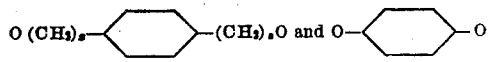

where $x$ and $z$ are integers, the same or different, not exceeding 6, from acids of the general formula

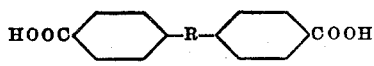

where R is sulphur or the group $S(CH_2)_zS$ where $x$ is an integer not exceeding 6, or from ester-forming derivatives of these acids, and the appropriate glycol or ester-forming derivative thereof.

Ester-forming derivatives of the aromatic dicarboxylic acids which have been proposed include esters (including half-esters) such as low alkyl esters, cycloalkyl esters and aryl esters, acid halides and ammonium or amine salts. Examples of suitable esters include those formed from methyl, ethyl, propyl, butyl, amyl, hexyl or heptyl alcohols or from phenol or its homologues.

Glycols which have been proposed for use in the production of the polyesters, either as the glycols themselves or in the form of ester-forming derivatives thereof, for example, esters with low molecular weight carboxylic acids, include ethylene glycol, trimethylene glycol, tetramethylene glycol, pentamethylene glycol, hexamethylene glycol and even higher glycols.

The linear polyesters may be formed by heating the several ingredients together, in the presence or absence of catalysts which speed up the interaction, under conditions such that by-products of the interaction and any excess of the glycol are removed from the reaction zone. Usually the later stages of the heating are conducted under a reduced pressure so as to facilitate removal of by-products and excess of glycol, and usually the heating is conducted throughout under conditions such that the reaction mass is not exposed to the action of oxygen. The heating is usually continued until filaments formed from a melt of the reaction product can be permanently extended by cold drawing into useful fibres of high tenacity.

The present invention is concerned with improvements in the production of filaments, fibres and other shaped articles from melts of certain linear polyesters.

The production of fibres from highly polymeric fibre-forming organic materials is conveniently effected firstly by spinning or extruding or drawing filaments from melts thereof followed by a drawing operation whereby the filaments are permanently extended to as much as several times their original lengths. As is well known, the successful large-scale production of such fibres can only be achieved if the molecular weight and dependent physical properties of the polymers remain more or less constant whilst they are in a molten condition. Some highly polymeric fibre-forming materials, for instance the linear polyamides, tend to increase slowly in molecular weight whilst they are in a molten condition and, when forming filaments from melts thereof, special precautions are usually taken to avoid this. Others, for instance the linear polyesters, tend to decrease in molecular weight whilst they are in a molten condition. In the case of the highly polymeric linear polyesters obtainable from aromatic dicarboxylic acids and glycols, the decrease in molecular weight whilst in the molten condition is usually so rapid that the production of satisfactory fibres therefrom is difficult if not impossible. Further, this molecular degradation also impairs the physical properties of other articles formed from melts of these polyesters.

We have found that these difficulties with the linear polyesters are caused at least in part by the presence of traces of water and that a rigorous exclusion of water from the melts obviates or reduces these difficulties.

Thus, according to the present invention, in a process for the production of filaments, fibres and other shaped articles from melts of highly polymeric linear polyesters (including interpolyesters) obtainable from aromatic dicarboxylic acids and glycols, we provide the improvement which comprises melting and maintaining melts of said polyesters under conditions such that the presence of water in any form is rigorously excluded.

The conditions should be so controlled that the concentration of water in contact with the melt is in the proportion of not more than 0.005 molecule of water, preferably less than 0.001 molecule, per repeating unit of the highly polymeric linear polyester being used.

The invention is conveniently described by reference to a fibre-forming linear polyester obtainable from a particular aromatic acid, terephthalic acid, and a particular glycol, ethylene glycol, namely, polyethylene terephthalate. This linear polyester has repeating units of the structure:

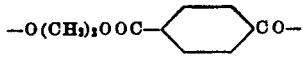

When such a polyester having an average molecular weight of about 8,000 to 10,000, i. e. the average number of repeating units per molecule is some 40 to 50, is stored under atmospheric conditions for several days, it absorbs up to as much as 0.6% of its weight of water (about 0.06 molecule of water per repeating unit). When this water-containing polyester is melted and maintained as a melt, the viscosity of the melt falls off rapidly, thus indicating a rapid decrease in the molecular weight of the polyester. This degradation, which we believe to be at least partly due to hydrolysis, is so great that the polyester rapidly loses its capability of being formed into useful fibres.

This degradation on melting can be obviated by intensively drying the polyester before melting and then melting the dried polyester under conditions such that water in any form is not permitted to come into contact with the melt. Generally the intensive drying is effected by heating the polyester at an elevated temperature below its melting point under a reduced pressure, preferably under a high vacuum, for a period of time sufficient to reduce the water-content to the required extent.

If desired, a conventional drying agent may be used to facilitate the drying operation and more especially to shorten the time of heating required for removal of water from the linear polyester. Suitable drying agents include, magnesium and barium perchlorates, magnesium and calcium chlorides, calcium, aluminium and phosphorus oxides, and silica gel. When using a drying agent, the heating is effected, at a reduced pressure or not, under conditions such that the drying agent is in the vicinity of the linear polyester which is being dried. Alternatively, drying may be facilitated by passing a stream of an oxygen-free gas, for example, nitrogen, over the heated polyester.

If desired, the drying operation may be carried out in stages, more drastic conditions being used as the water-content of the polyester becomes lowered.

Measurement of the intrinsic viscosity of the linear polyester before and after melting provides a convenient means for obtaining an indication of its water content, at least on a relative basis. Intrinsic viscosity is defined as $$\frac{\log_e \eta r}{C}$$

in which $\eta r$ is the viscosity of a dilute solution (e. g. 0.5–1.0%) of the linear polyester in a suitable solvent divided by the viscosity of the solvent at the temperature of measurement (e. g. 25° C.) and in the same units, and C is the concentration expressed in grams per 100 cc. of solution. The water-content of the polyester should be such that, when it is melted and maintained in the molten condition for a short period of time, its intrinsic viscosity does not fall by more than 20% of the original value, preferably by not more than 5% of the original value. If comparative intrinsic viscosity measurements on a linear polyester, before and after melting, show a fall of more than 20% of the original value then the water-content is too great and a drying operation is required. The effectiveness of the drying operation can be assessed, of course, by comparative measurements of the intrinsic viscosities of samples.

Linear polyesters which are sufficiently dry may be formed from the melt into filaments and like shapes in any conventional manner, provided that care is taken to avoid contact with water in any form, that is to say, in the form of liquid or vapour.

If desired, the need for the drying operation may be wholly or partly dispensed with by keeping the linear polyester in a water-free atmosphere.

The invention is illustrated but not limited by the following examples:

EXAMPLE 1

Powdered, highly polymeric, polyethylene terephthalate (M. P. 258° C.; intrinsic viscosity 0.40) is dried by heating at 90° C. for 1 hour at a pressure of less than 0.001 mm. of mercury; this is not sufficiently dried and the intrinsic viscosity of a melt of this dried polyester falls off appreciably.

The polyester is further dried by heating at 200° C. for 2.5 hours at a pressure of less than 0.001 mm. Hg; this dried polyester is then melt spun into lustrous filaments which can easily be drawn into fibres of high tenacity.

The results obtained are set forth in the following Table I:

Table I

| Sample | Water-Content, percent by weight | Molecules of H₂O per repeating unit | Intrinsic Viscosity of melt after 1 hour at 277° C. | Fibre forming Capability |
|---|---|---|---|---|
| Undried | 0.6 | 0.064 | 0.16 | Poor. |
| Dried at 90° C. for 1 hour | 0.07 | 0.007 | 0.33 | Forms fibres of low tenacity. |
| Further dried at 200° C. for 2½ hours | less than 0.01 | less than 0.001 | 0.39 | Forms fibres of high tenacity. |

The intrinsic viscosities in this example are determined by using 0.5% solutions of the polyester in a mixture of phenol and m-cresol (1:3 by volume).

The following example is illustrative of varying conditions for intensively drying the linear polyester:

EXAMPLE 2

Quantities of highly polymeric polyethylene terephthalate (M. P. 258° C.; intrinsic viscosity 0.73) in the form of small chips of about 1/16 inch in cross-section which have been exposed to air are dried by heating under the conditions set forth in Table II. The dried quantities of the polyester are then melted by heating up to 283° C. and maintained in the melted condition at this temperature for 45 minutes. The melts are cooled, and the intrinsic viscosities are again determined; these viscosities are expressed in the final column of Table II.

Table II

| Drying agent used | Time of drying | Temperature of drying | Pressure during drying—in mm. of mercury | Intrinsic Viscosity after melting |
|---|---|---|---|---|
| None | None | °C. | | 0.29 |
| Do | 110 mins | 210 | 18–20 | 0.60 |
| Do | 110 mins | 210 | 0.02 | 0.68 |
| Do | 17 hours | 210 | 16–22 | 0.72 |
| Phosphorus pentoxide | 110 mins | 210 | 58–65 | 0.68 |
| Do | 110 mins | 210 | 0.01 | 0.72 |
| Dry nitrogen stream | 110 mins | 210 | 3–4 | 0.685 |

In those cases in which the polyester has been sufficiently dried so that on melting its intrinsic viscosity does not fall below 0.68, the melt can be satisfactorily formed into filaments which can be drawn out into fibres of high tenacity.

In the case in which the water-content of the polyester remains so high that on melting its intrinsic viscosity falls to 0.60, which corresponds to a fall of more than 20% of the original value, the melt can be formed into filaments but these filaments have inferior properties.

The intrinsic viscosities in this example are determined by using 1.0% solutions of the polyester in a mixture of phenol and tetrachloroethane (3:2 by weight).

The following example is illustrative of the drying of a linear polyester other than polyethylene terephthalate:

EXAMPLE 3

Powdered, highly polymeric polyethylene diphenoxyethane-4:4'-dicarboxylate (M. P. 230° C.; intrinsic viscosity 0.52) which has been exposed to air is dried by heating at 90° C. for 1 hour at a pressure of less than 0.002 mm. of mercury, followed by 2 hours at 200° C. at the same pressure.

The so obtained dry polyester has a water content of less than 0.001 molecules of H₂O per repeating unit of the polyester and its viscosity does not fall off appreciably on melting, being 0.51 after 1 hour at 270° C.; its filament and fibre-forming capability are excellent.

The undried polyester on melting shows a fall in intrinsic viscosity of 0.09; it can be formed into filaments which on cold-drawing give fibres with inferior properties, for example, with low tenacity.

The intrinsic viscosities in this example are determined by using 1.0% solutions of the polyester in a mixture of phenol and tetrachloroethane (3:2 by weight).

In addition to the particular linear polyesters mentioned in the foregoing description and examples linear polyesters which also may be used dry or dried according to the present invention and thereafter formed from the melt into filaments, fibres and other shaped articles or used for hot-melt coatings, adhesives and the like include those obtainable from terephthalic acid and trimethylene glycol, terephthalic acid and tetramethylene glycol, terephthalic acid and hexamethylene glycol, terephthalic acid and decamethylene glycol, diphenoxypropane-4:4'-dicarboxylic acid and ethylene glycol, diphenoxybutane-4:4'-dicarboxylic acid and ethylene glycol, diphenoxypentane-4:4'-dicarboxylic acid and ethylene glycol, diphenoxyhexane-4:4'-dicarboxylic acid and ethylene glycol, diphenoxypentane-4:4'-dicarboxylic acid and hexamethylene glycol, diphenoxyhexane-4:4'-dicarboxylic acid and decamethylene glycol, diphenylmethane-4:4'-dicarboxylic acid and ethylene glycol, $\alpha$:$\delta$-diphenylbutane-4:4'-dicarboxylic acid and ethylene glycol, naphthalene-1:5-dicarboxylic acid and ethylene glycol, naphthalene-2:6-dicarboxylic acid and ethylene glycol, naphthalene-2:7-dicarboxylic acid and ethylene glycol, naphthalene-2:6-dicarboxylic acid and hexamethylene glycol 1:4-diphenoxybenzene-4':4''-dicarboxylic acid and ethylene glycol, 1:4-bis-(phenoxymethyl)-benzene-4':4''-dicarboxylic acid and ethylene glycol, (phenoxymethyl)-benzene-4:4'-dicarboxylic acid and ethylene glycol, phenoxybenzene-4:4'-dicarboxylic acid and ethylene glycol, $\alpha$:$\beta$-bis-(phenylthio)-ethane-4:4'-dicarboxylic acid and ethylene glycol, and diphenylthioether-4:4'-dicarboxylic acid and ethylene glycol.

Whilst the invention has been described with particular reference to the formation of filaments and fibers it will be apparent that it is of value in the production of other articles from melts, for example films, mouldings, coatings and adhesive unions. Thus, for example, a compression moulding produced from polyethylene terephthalate which is dry according to the requirements of the present invention is appreciably tougher and markedly less brittle than a similar moulding made from polyethylene terephthalate containing absorbed moisture. Similarly, superior properties are obtained by using melts of dry polyesters for the production of films, coatings or adhesive unions.

We claim:

1. In a process for the production of filaments, fibres and other structures from a melt of highly polymeric linear polyester obtainable from aromatic dicarboxylic acids and glycols, the steps which comprise intensively drying preformed particles of solid polyester before melting until the water content is reduced to not more than 0.005 molecule of water per repeating unit of highly polymeric linear ester being used, and then melting the polyester and maintaining the resulting melt under conditions such that the concentration of water in contact with said melt is in the proportion of not more than 0.005 molecule of water per repeating unit of highly polymeric linear ester being used.

2. The process according to claim 1 wherein intensively drying comprises heating the polyester at an elevated temperature below its melting point under reduced pressure for a period of time sufficient to reduce the water content to the required extent.

3. The process according to claim 1 wherein intensive drying is effected with the aid of desiccants.

4. The process according to claim 1 wherein intensively drying comprises heating the polyester to an elevated temperature below its melting point and passing a stream of an oxygen-free gas over the heated polyester.

5. The process according to claim 1 wherein the concentration of water in said preformed particles of solid polyester and in contact with said melt is in the proportion of not more than 0.001 molecule of water per repeating unit of highly polymeric linear ester being used.

6. The process of claim 1 wherein the polyester is polymeric polymethylene terephthalate.

7. The process of claim 1 wherein the polyester is polymeric ethylene terephthalate.

EDWARD GEORGE EDWARDS.
REGINALD JOHN WILLIAM REYNOLDS.

REFERENCES CITED

The following references are of record in the file of this patent:

UNITED STATES PATENTS

| Number | Name | Date |
|---|---|---|
| 2,071,250 | Carothers | Feb. 16, 1937 |
| 2,071,251 | Carothers | Feb. 16, 1937 |
| 2,253,176 | Graves | Aug. 19, 1941 |
| 2,273,188 | Graves | Feb. 17, 1942 |